United States Patent

Asakura et al.

[11] Patent Number: 5,168,387
[45] Date of Patent: Dec. 1, 1992

[54] VARIABLE LIGHT TRANSMITTANCE DEVICE

[75] Inventors: Motoh Asakura; Yukitoshi Yanagida; Hiroshi Inaba, all of Mie, Japan

[73] Assignee: Central Glass Company, Limited, Ube, Japan

[21] Appl. No.: 808,888

[22] Filed: Dec. 18, 1991

[30] Foreign Application Priority Data

Dec. 21, 1990 [JP] Japan ............................ 2-401403[U]

[51] Int. Cl.⁵ .................... G02F 1/01; G02F 1/55; G02B 26/00; H01R 9/09
[52] U.S. Cl. .................... 359/276; 359/266; 359/296; 359/88; 439/72
[58] Field of Search ............. 359/87, 88, 266, 296, 359/276

[56] References Cited

U.S. PATENT DOCUMENTS

| | | | |
|---|---|---|---|
| 3,807,833 | 4/1974 | Graham et al. | 359/88 |
| 3,912,365 | 10/1975 | Lowell | 359/296 |
| 4,362,903 | 12/1982 | Eichelberger et al. | 359/88 |
| 4,921,430 | 5/1990 | Matsuoka | 439/72 |

FOREIGN PATENT DOCUMENTS

| | | | |
|---|---|---|---|
| 1-73831 | 5/1989 | Japan | . |
| 1-77620 | 5/1989 | Japan | . |
| 0027677 | 1/1990 | Japan | 439/72 |

Primary Examiner—Eugene R. LaRoche
Assistant Examiner—Evelyn A. Lester
Attorney, Agent, or Firm—Keck, Mahin & Cate

[57] ABSTRACT

A device for controlling transmittance of light therethrough includes first and second transparent substrates which are spaced from each other. The first substrate has at an end portion thereof a notch. First and second transparent electrode layers are respectively coated on inner surfaces of the first and second substrates for defining a space therebetween. The first layer is partially cut off so as to conform to a periphery of said notch. An electro-optically responsive material substantially fills up the space. The material is made so as to allow transmittance of light therethrough to change in response to voltages applied between the first and second layers. A terminal is received in said notch and said space, and is sized so as to be biased against the first substrate and the second layer so as to ensure an electrical contact between the terminal and the second layer.

10 Claims, 1 Drawing Sheet

VARIABLE LIGHT TRANSMITTANCE DEVICE

BACKGROUND OF THE INVENTION

1. Field of the Invention

The present invention relates in general to a variable light transmittance device for controlling transmittance of light therethrough by means of liquid crystal, electrochromic (EC) material, or the like. More particularly, the present invention relates to a structure for connecting an electrical terminal to the device.

2. Description of the Prior Art

Hitherto, various devices have been proposed for controlling transmittance of light therethrough, such as the light valve, the liquid crystal display and the electrochromic display. These devices have been used to display drawings, letters or the like, or to control transmittance of the sunlight through a window pane or the like.

In order to clarify the task of the present invention, conventional structures for connecting a terminal to a variable light transmittance device will be outlined in the following.

Japanese Utility Model First Provisional Publication 1-77620 discloses a first device for controlling transmittance of light by means of liquid crystal. The first device comprises two oppositely arranged substrates. The inner surfaces of the substrates are coated with transparent and conductive films which are spaced from each other. Two units each consisting of the substrates and the films are slightly displaced in parallel relative to each other. With this, there is provided two exposed end portions of the units. A layer of liquid crystal is interposed between oppositely arranged major surfaces of the films. Each end portion has a through hole for fixing an electrical terminal thereon. A fixing portion of the terminal is passed through the through hole and fixed to the end portion. With this, the terminal is electrically connected to the film. A lead is connected to the terminal for applying voltages between films, thereby controlling transmittance of light through the first device.

Japanese Utility Model First Provisional Publication 1-73831 discloses a second device for controlling transmittance of light by means of liquid crystal. The second device also comprises two oppositely arranged substrates of which inner surfaces are coated with two oppositely arranged transparent and conductive films, and a liquid crystal layer which is interposed between the films. There is provided a notched end portion for providing a space defined above an end portion of each substrate, to which end portion silver paste is applied. A terminal is soldered to the silver paste which is electrically connected the film.

However, the above-mentioned conventional first and second devices have following drawbacks.

First, since it is necessary to displace the units of the first device relative to each other or to notch end portions of the second device for connecting the terminal to the first or the second device, an entire major surface of the first or second device can not serve for controlling transmittance of light therethrough.

Secondly, since a connecting process of the terminal to the first or the second device is relatively complicated, the production cost is increased.

SUMMARY OF THE INVENTION

It is therefore an object of the present invention to provide a device for controlling transmittance of light therethrough, which device has a relatively enlarged area for controlling transmittance of light.

It is another object of the present invention to provide a device for controlling transmittance of light therethrough, to which device a terminal is electrically connected in a relatively simple manner.

According to the present invention, there is provided a device for controlling transmittance of light therethrough, including: first and second transparent substrates which are spaced from each other; first and second transparent electrode layers which are respectively coated on inner surfaces of the first and second substrates, the first and second layers defining a space therebetween; an electro-optically responsive material which substantially fills up the space, the material being made so as to allow transmittance of light therethrough to change in response to voltages applied between the first and second layers; a terminal which is interposed between the first and second substrates and which is sized so as to be biased against the second layer so as to ensure an electrical contact between the terminal and the second layer; and means for electrically isolating the terminal from the first layer and the material.

DESCRIPTION OF THE PREFERRED EMBODIMENTS

Figure 1:
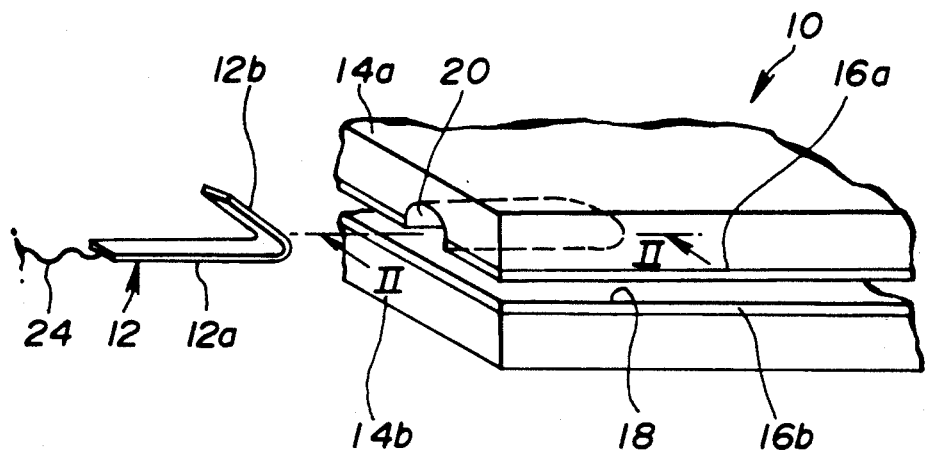
FIG. 1 is a partial and perspective view of a device for controlling transmittance of light therethrough in accordance with the present invention, showing a condition in which a terminal according to a first embodiment of the present invention is away from the device.
Figure 2:
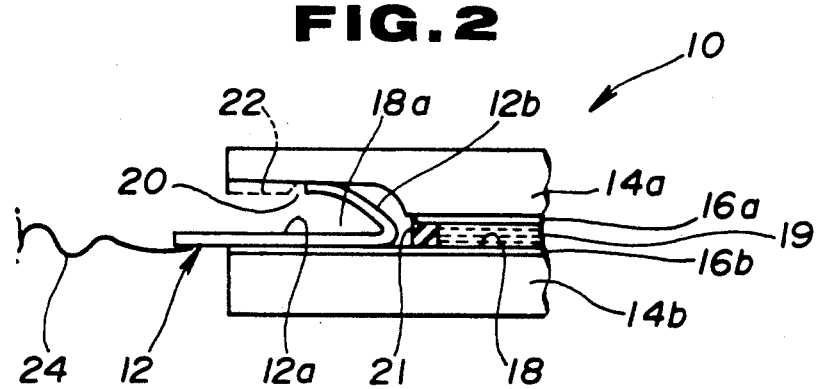
FIG. 2 is a sectional view which is taken along the line II—II of FIG. 1, but showing a condition in which the terminal is received in the device.

Referring to FIGS. 1 and 2, there is shown a device 10 for controlling transmittance of light therethrough in accordance with the present invention, which device 10 includes two terminals 12 (only one is shown) in accordance with a first embodiment of the present invention.

As is seen from FIG. 1, the device 10 has oppositely arranged transparent substrates 14a and 14b which are spaced from and parallel to each other. The substrates 14a and 14b are made of glass or synthetic resin high in transparency. The inner surfaces of the substrates 14a and 14b are coated with transparent and conductive films 16a and 16b which are spaced from and parallel to each other. Each film 16a or 16b is made of $SnO_2$, $In_2O_3$, ITO, or the like. The films 16a and 16b have a space 18 therebetween. The space 18 is substantially filled up with a so-called electro-optically responsive material 19 which is, for example, a fluid suspension used for a light valve. However, if desired, a liquid crystal, an electrochromic material, or the like may be substituted for the suspension. The suspension has, for example, acicular colloidal particles which are dispersed in a medium. The particles are such that they are capable of having their orientation changed on the application of an electric field. Before the application of the field across the suspension, the suspension will appear almost opaque since the particles are not aligned. However, when the field is applied across it, the particles become aligned so that the suspension will appear transparent. Thus, transmittance of light through the device 10 can be controlled.

The space 18 is peripherally sealed with a seal 21 which is made of an insulating material, except two portions 18a (only one is shown) of the space 18, to confine the suspension therein, the portions 18a receiving therein the terminals 12.

The device 10 has two structures for respectively connecting the two terminals 12 to the films 16a and 16b for applying voltages between the films 16a and 16b. Since the two structures and two terminals 12 are respectively identical in their constructions, only one structure and only one terminal will be described in the following.

The substrate 14a has, for example, a generally semicylindrical notch 20. However, the notch 20 is not limited to semicylindrical in shape. It may have a wedged shape, a spindled shape, or other suitable shapes. The film 16a is partially cut off to conform to the inner periphery of the notch 20, as illustrated. With this, the film 16a does not interfere with the insertion of the terminal 12 into the device 10.

As is seen from FIG. 2, the terminal 12 which is made of, for example, a strip of a phosphor bronze sheet is employed for applying voltages across the suspension. However, if desired, other metals or other conductive materials may be used for the terminal 12, or the terminal 12 can be made of an insulating material which is coated with a conductive film. If desired, the terminal 12 may be made of shape memory alloy, too. The terminal 12 is, for example, 1 mm in width, 0.3 mm in thickness, and 15 mm in total length. The terminal 12 is bent so as to have a major portion 12a and a barb-like portion 12b which are, for example, about 12 mm and about 3 mm in length, respectively. The barb-like portion 12b is made so as to be elastically deformed. The terminal 12 is received in the device 10 so as to urge the barb-like portion 12b and the major portion 12a to be biased against an upper surface of the notch 20 and against the film 16b, respectively. Under this condition, a good electrical contact between the film 16b and the terminal 12 is ensured.

If desired, a projection 22 can be formed on the substrate 14a so as to prevent the terminal 12 from coming off the device 10.

An example of a process for manufacturing the device 10 will be described in the following.

First, the substrate 14a which is coated with the film 16a is ground to have, for example, a generally semicylindrical notch 20 which is 2 mm in width, 1 mm in thickness, and 6 mm in length. For grinding the substrate 14a, a disklike, a cylindrical or a conical rotary grinding machine (not shown) may be used. This grinding process can be easily made so as to substantially suppress the occurrence of fractures or cracks on the substrate 14a.

Then, the substrates 14a and 14b coated with the films 16a and 16b are positioned away from each other to have the space 18 therebetween. Then, the space 18 is peripherally sealed by the seal 21 except the portion 18a of the space 18. Then, for example, the suspension of the light valve is injected into the space 18 through, for example, a thin tube (not shown) inserted through the seal 21. Then, the terminal 12 is thrust into the device 10. If desired, the suspension can be injected into the space 18 after inserting the terminal 12 into the device 10.

Then, a lead 24 is soldered at its one end to the major portion 12a of the terminal 12, and at its the other end to a voltage source (not shown). However, if desired, the lead 24 may be previously soldered to the terminal 12.

Then, if desired, insulating high molecular compounds (not shown) such as a epoxy resin, a urethane resin or the like may be used for filling the notch 20 and the portion 18a of the space 18. With this, the terminal 12 is fixed in position, airtightly partially sealed and properly insulated, thereby ensuring a proper function of the device 10 and improving the durability of the same. The compounds can be also used for insulating a connection between the lead 24 and the terminal 12.

Referring to FIGS. 3 to 6, there are shown other types of terminal in accordance with second to fifth embodiments of the present invention.

Detailed explanations of parts and constructions of the second to the fifth embodiments which are substantially the same as those of the above-mentioned first embodiment will be omitted from the following description.

Figure 3:
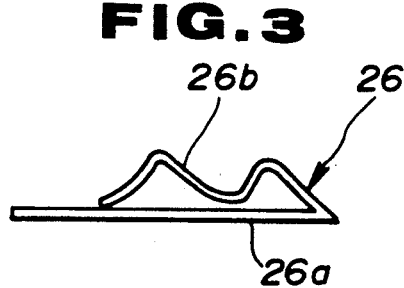
FIG. 3 is a side view of a terminal according to a second embodiment of the present invention.

As is seen from FIG. 3, a terminal 26 according to the second embodiment has a major flat portion 26a and a corrugated portion 26b which is secured at one end thereof to the flat portion 26a. Upon received in the device 10, the corrugated portion 26b is elastically deformed and produces a bias which urges the flat portion 26a into good electrical contact with the film 16b.

Figure 4:
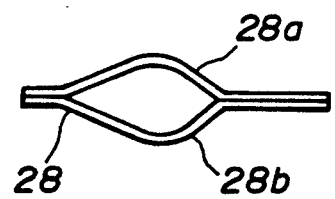
FIG. 4 is a view similar to FIG. 3, but showing a third embodiment of the present invention.

As is seen from FIG. 4, a terminal 28 according to the third embodiment has two strips 28a and 28b which are symmetrically arranged and secured at their both end portions to each other. At least, the strip 28b is made of a conductive material. The terminal 28 has two curved portions, such that it is also elastically deformed upon inserted into the device 10.

Figure 5:
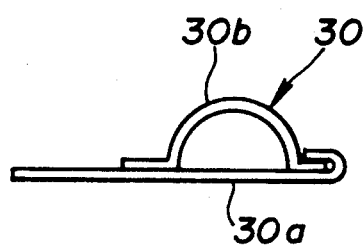
FIG. 5 is a view similar to FIG. 3, but showing a fourth embodiment of the present invention.

As is seen from FIG. 5, a terminal 30 according to the fourth embodiment has a conductive and generally flat portion 30a and a generally semicircular portion 30b which is elastically deformable and secured at one end thereof to the conductive portion 30a.

Figure 6:
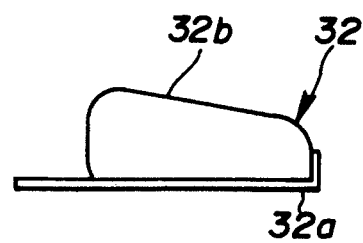
FIG. 6 is a view similar to FIG. 3, but showing a fifth embodiment of the present invention.

As is seen from FIG. 6, a terminal 32 according to the fifth embodiment has a conductive and generally flat portion 32a and an elastically deformable portion 32b which is made of rubber, plastic, wood, a shape-memory high-molecular material, or the like and is secured to the flat portion 32a.

Advantages of the present invention will be described in the following.

First, since the terminal can be electrically connected to the device in the above-described simple manner, the production cost can be reduced.

Secondly, the notch can be formed on the substrate without causing the substrate to have fractures.

What is claimed is:

1. A device for controlling transmittance of light therethrough, comprising:
first and second transparent substrates which are spaced from each other;
first and second transparent electrode layers which are respectively coated on inner surfaces of said first and second substrates, said first and second layers defining a space therebetween;

an electro-optically responsive material which substantially fills up said space, said material being made so as to allow transmittance of light therethrough to change in response to voltages applied between said first and second layers;

a terminal which is interposed between said first and second substrates and which is sized so as to be biased against said second layer so as to ensure an electrical contact between said terminal and said second layer; and means for electrically isolating said terminal from said first layer and said material.

2. A device as claimed in claim 1, in which said material is away from said terminal, such that said terminal is electrically isolated from said material.

3. A device as claimed in claim 1, in which said first substrate has a portion which projects into said notch so as to dispose said terminal in position.

4. A device as claimed in claim 1, in which said first substrate has at an end portion thereof a notch which is united with a portion of said space, said notch and said portion of said space receiving therein first and second portions of said terminal respectively, and in which said first layer is partially cut off so as to be away from said terminal.

5. A device as claimed in claim 4, further comprising an insulation which is injected into at least one of said notch and said portion of said space after inserting said terminal into said notch and said portion of said space.

6. A device as claimed in claim 5, in which said insulation is a high molecular compound.

7. A device as claimed in claim 4, in which said terminal has an elastically deformable portion, such that, when said terminal is received in said notch and said portion of said space, said terminal is biased against said second layer and said first substrate, thereby ensuring an electrical contact between said terminal and said second layer.

8. A device as claimed in claim 7, in which said terminal is shaped so as to produce said elastically deformable portion thereof.

9. A device as claimed in claim 7, in which said elastically deformable portion of said terminal is made of an elastically deformable material.

10. A device as claimed in claim 7, further comprising a seal which is made of an insulating material and disposed in said space and which bounds on said portion of said space, thereby allowing said terminal to be inserted into said portion of said space and to be electrically isolated from said material.

* * * * *